United States Patent
Weihs et al.

(10) Patent No.: US 10,207,322 B2
(45) Date of Patent: Feb. 19, 2019

(54) MECHANICAL PROCESSING OF REACTIVE LAMINATES

(71) Applicant: The Johns Hopkins University, Baltimore, MD (US)

(72) Inventors: Timothy P. Weihs, Baltimore, MD (US); Adam Stover, Towson, MD (US)

(73) Assignee: The Johns Hopkins University, Baltimore, MD (US)

( * ) Notice: Subject to any disclaimer, the term of this patent is extended or adjusted under 35 U.S.C. 154(b) by 152 days.

(21) Appl. No.: 14/918,272

(22) Filed: Oct. 20, 2015

(65) Prior Publication Data
US 2016/0039003 A1   Feb. 11, 2016

Related U.S. Application Data (62) Division of application No. 13/503,635, filed as application No. PCT/US2010/053965 on Oct. 25, 2010, now Pat. No. 9,186,755.

(Continued)

(51) Int. Cl.
*B22F 3/23*   (2006.01)
*B22F 1/00*   (2006.01)
(Continued)

(52) U.S. Cl.
CPC .......... *B22F 1/0003* (2013.01); *B22F 1/0011* (2013.01); *B22F 3/17* (2013.01); *B22F 3/23* (2013.01); *B22F 9/04* (2013.01); *B23K 35/26* (2013.01); *B23K 35/30* (2013.01); *B23K 35/34* (2013.01); *B32B 5/16* (2013.01); *B32B 15/017* (2013.01); *B22F 2009/043* (2013.01);
(Continued)

(58) Field of Classification Search
None
See application file for complete search history.

(56) References Cited

U.S. PATENT DOCUMENTS

| | | | | |
|---|---|---|---|---|
| 4,331,080 A | * | 5/1982 | West | C06B 21/0008 102/301 |
| 4,432,818 A | * | 2/1984 | Givens | C06B 43/00 149/108.2 |
| 4,751,048 A | * | 6/1988 | Christodoulou | B22F 3/23 420/129 |
| 4,965,044 A | * | 10/1990 | Miyamoto | C04B 35/5607 419/10 |
| 5,330,701 A | | 7/1994 | Shaw et al. | |

(Continued)

OTHER PUBLICATIONS

International Search Report and Written Opinion of PCT/US2010/053965.

*Primary Examiner* — George Wyszomierski
(74) *Attorney, Agent, or Firm* — Venable LLP; Henry J. Daley (57) ABSTRACT

A method of producing a reactive powder includes providing a bulk structure of reactive material comprising a first reactant and a second reactant, the bulk structure having a preselected average spacing between the first and the second reactants; and mechanically processing the bulk structure of reactive material to produce a plurality of particles from the bulk structure such that each of the plurality of particles comprises the first and second reactants having an average spacing that is substantially equal to the preselected average spacing of the bulk structure of reactive material. The first and second materials of the plurality of particles react with each other in an exothermic reaction upon being exposed to a threshold energy to initiate the exothermic reaction and remain substantially stable without reacting with each other prior to being exposed to the threshold energy.

17 Claims, 9 Drawing Sheets

Related U.S. Application Data (60) Provisional application No. 61/254,227, filed on Oct. 23, 2009.

(51) Int. Cl.
| | |
|---|---|
| *B22F 3/17* | (2006.01) |
| *B32B 5/16* | (2006.01) |
| *B22F 9/04* | (2006.01) |
| *B23K 35/34* | (2006.01) |
| *B32B 15/01* | (2006.01) |
| *B23K 35/26* | (2006.01) |
| *B23K 35/30* | (2006.01) |

(52) U.S. Cl.
CPC ..... *B22F 2009/047* (2013.01); *B22F 2998/10* (2013.01); *Y10T 428/2982* (2015.01); *Y10T 428/2991* (2015.01)

(56) References Cited

U.S. PATENT DOCUMENTS

| | | |
|---|---|---|
| 5,340,533 A | 8/1994 | Stangle et al. |
| 5,381,944 A * | 1/1995 | Makowiecki ........ B23K 35/001 228/124.5 |
| 5,455,001 A | 10/1995 | Hu |
| 5,538,795 A | 7/1996 | Barbee, Jr. et al. |
| 5,547,715 A | 8/1996 | Barbee, Jr. et al. |
| 6,534,194 B2 | 3/2003 | Weihs et al. |
| 6,881,284 B2 * | 4/2005 | Makowiecki ....... C06B 21/0066 149/109.6 |
| 6,991,856 B2 | 1/2006 | Weihs et al. |
| 7,361,412 B2 | 4/2008 | Wang et al. |
| 2001/0046597 A1 | 11/2001 | Weihs et al. |
| 2008/0063889 A1 | 3/2008 | Duckham et al. |
| 2009/0178741 A1 | 7/2009 | Xun et al. |

* cited by examiner

MECHANICAL PROCESSING OF REACTIVE LAMINATES

CROSS-REFERENCE OF RELATED APPLICATION

This application is a Divisional of U.S. patent application Ser. No. 13/503,635 filed Jun. 4, 2012, now U.S. Pat. No. 9,186,755, the entire contents of which are hereby incorporated by reference. This application claims priority to U.S. Provisional Application No. 61/254,227 filed Oct. 23, 2009, the entire contents of which are hereby incorporated by reference.

This invention was made with Government support of Grant No. N00014-07-0740, awarded by the Department of Defense, Office of Naval Research. The Government has certain rights in this invention.

BACKGROUND

1. Field of Invention

The field of the current invention relates to methods of producing reactive laminated particles, and more particularly to mechanical methods of producing reactive laminated particles and the reactive laminated particles and products incorporating the reactive laminated particles.

2. Discussion of Related Art

Materials that react exothermically in controllable and predictable ways are desirable for many energetic applications such as: pyrotechnics, heaters, delays, munitions, explosives and propulsion, for example. In addition, increases in long-term stability, improvements in the rate and energy of reactions, and the ability to control and tune the rates and energies of reactions are also desirable for many applications.

In order to increase the reactivity of particulate systems, researchers in the past have developed powders or particles with nanometer scale diameters or dimensions. While more reactive, these powdered particles have been known to suffer from surface contamination, agglomeration in larger particles, non-uniform distributions of reactants and densities in multi-powder compacts, variability in particle size, and chemical instability.

Other methods to form reactive particles have involved forming core/shell particles. However, the resulting particles typically have only two to three shells or layers and thus are very small and very hard to manipulate if the reactant spacing (shell thickness) is only tens of nanometers thick. For ease of handling, it is desirable to use reactive particles with geometries that range in thickness, width, length or diameter from a few microns to several hundred microns, and reactive particles with geometries that enable packing or volume fractions ranging from 5% to almost 70%.

A different class of energetic materials, known as reactive multilayer foils and energetic nanolaminates comprising alternating layers of materials with large negative heats of mixing, has largely overcome many of the shortcomings of reactive powders and particles by enabling tuning and control of specific reactant chemistries that enable desired levels of stored energy and specific reactant spacing within the particles that enables a desired ignition threshold. In particular, the various design choices available for layer materials, layer dimensions, overall dimensions, bilayer periodicity, etc. enable such reactive multilayer foils and energetic nanolaminates to be particularly tuned and controlled.

Reactive laminate particles or powders can be fabricated by physical vapor deposition methods as described in our previous provisional patent (T. P. Weihs, G. Fritz, R. Knepper, J. Grzyb, A. Gash, J. Sze, Layered Reactive Particles with Controllable Geometries, Energies and Reactivities and Methods of Making the Same, U.S. Provisional Patent Application No. 61/107,915, filed Oct. 23, 2008; and U.S. application Ser. No. 12/605,281, filed Oct. 23, 2009), the entire contents of both of which are incorporated herein by reference. However, such fabrication methods can be expensive and alternative methods for low-cost, large volume fabrication of reactive laminate particles are desired for many applications.

Physical vapor deposition (PVD) of laminate reactive materials provides excellent control of chemistry, total thickness, and reactant spacing and thus is used for making thin films and foils (T. W. Barbee, Jr. and T. P. Weihs, Ignitable, Heterogeneous, Stratified Structures for the Propagation of an Internal Exothermic, Chemical Reaction along an Expanding Wavefront, U.S. Pat. No. 5,538,795, Jul. 23, 1996; T. W. Barbee, Jr. and T. P. Weihs, Method for Fabricating an Ignitable, Heterogeneous, Stratified Structure, U.S. Pat. No. 5,547,715, Aug. 20, 1996; T. P. Weihs, O. M. Knio, M. Reiss, D. Van Heerden, Method of Making and Using Free Standing Reactive Multilayer Foils, U.S. Pat. No. 6,991,856, Jan. 31, 2006). However, fabrication of bulk laminate materials by PVD is costly and very challenging. The cost can even be higher for making thick films (>100 μm). The high cost of fabrication can be attributed in part to the poor material utilization during PVD and the high capital costs of the deposition systems.

Mechanical fabrication of reactive materials (e.g., by rolling, forging and/or swaging) is a low cost method of making laminate reactive sheets and rods and thus very attractive (M. E. Reiss and T. P. Weihs, Method of Making Reactive Multilayer Foil and Resulting Product, U.S. Pat. No. 6,534,194, Mar. 18, 2003; Y. Xun, D. Lunking, E. Besnoin, D. Van Heerden, T. P. Weihs, O. M. Knio, Methods of Making Reactive Composite Materials and Resulting Products Thereof, U.S. Patent Application No. 2009/0178741, the entire contents of which are incorporated herein by reference). Material utilization is far better than PVD, material costs are low, and fabrication equipment is relatively inexpensive. However, when most reactive materials are rolled or swaged extensively to fabricate reactive materials with fine reactant spacing, the reactive materials often contain excessive cracking. These cracks can be both microcracks and macrocracks. The presence of cracks can lead to unwanted variability in material properties. Once initiated, self-propagating exothermic reactions can quench when the reaction front hits a large crack. The cracks can also lower the toughness of the samples, and their strengths and their ductilities can be very low, making handling and machining of the samples difficult.

For joining and sealing applications (soldering and brazing), energetic applications (reactive shells, fragments, pyrotechnic or other components) and heating applications (gas generators, thermal batteries) one often requires reactive materials in complex geometries such as patterned sheets or foils, curved sheets or foils, plates or rods with holes or open interiors, spherical or elliptical shapes, or nonuniform geometries.

One can pattern PVD films or foils via punching, etching or lift-off techniques. However, significant amounts of the sheet or foil can be wasted in some cases and one is often limited to planar geometries. One can form curved foils with PVD but fabricating thick curved sheets is challenging. Fabricating thin or thick sheets with complex curvatures is very challenging.

One can form rods, sheets or plates by swaging, rolling or even PVD and holes or patterns can be machined into these components but one wastes reactive material by doing so and the complexity that can be obtained is limited. Reactive materials with thick, nonuniform geometries are very difficult to fabricate by PVD of films and foils or by mechanical processing of rods, sheets or plates.

There thus remains the need for improved reactive materials and methods of producing reactive materials and products that incorporate the reactive materials.

SUMMARY

A method of producing a reactive powder according to some embodiments of the current invention includes providing a bulk structure of reactive material comprising a first reactant and a second reactant, the bulk structure having a preselected average spacing between the first and the second reactants; and mechanically processing the bulk structure of reactive material to produce a plurality of particles from the bulk structure such that each of the plurality of particles comprises the first and second reactants having an average spacing that is substantially equal to the preselected average spacing of the bulk structure of reactive material. The first and second materials of the plurality of particles react with each other in an exothermic reaction upon being exposed to a threshold energy to initiate the exothermic reaction and remain substantially stable without reacting with each other prior to being exposed to the threshold energy.

A reactive material according to some embodiments of the current invention has a plurality of reactive particles each of which is at least one of fused with or adhered to at least one adjacent reactive particle of the plurality of reactive particles to form a self-supporting structure, wherein each reactive particle of the plurality of reactive particles includes a first reactant and a second reactant having corresponding reactant spacing substantially equal to a preselected reactant spacing, and wherein the first and second reactants react with each other in an exothermic reaction upon being exposed to a threshold energy to initiate the exothermic reaction and remain substantially stable without reacting with each other prior to being exposed to the threshold energy.

A method of producing an object from a reactive powder according to some embodiments of the current invention includes providing a powder that includes a plurality of reactive particles, and compressing the powder to form a self-supporting structure that includes the plurality of reactive particles. Each reactive particle of the plurality of reactive particles includes a first reactant and a second reactant having corresponding reactant spacing substantially equal to a preselected reactant spacing. The first and second reactants react with each other in an exothermic reaction upon being exposed to a threshold energy to initiate the exothermic reaction and remain substantially stable without reacting with each other prior to being exposed to the threshold energy.

A method of patterning a layer of reactive material onto an object according to some embodiments of the current invention includes providing a plurality of reactive particles, and depositing the plurality of reactive particles onto a surface of the object. The depositing includes at least one of spraying, spreading, flowing or printing the plurality of reactive particles onto the surface of the substrate. Each reactive particle of the plurality of reactive particles includes a first reactant and a second reactant having corresponding reactant spacing substantially equal to a preselected reactant spacing, and the first and second reactants react with each other in an exothermic reaction upon being exposed to a threshold energy to initiate the exothermic reaction and remain substantially stable without reacting with each other prior to being exposed to the threshold energy.

BRIEF DESCRIPTION OF THE DRAWINGS

Further objectives and advantages will become apparent from a consideration of the description, drawings, and examples.

FIG. 1 is a schematic illustration of a rolling process that can be used to create reactive laminates according to an embodiment of the current invention. The light and dark layers correspond to alternating reactants A and B, which could be, but are not limited to, Al and Ni, respectively, in one example. To create the composite, clean sheets of Ni and Al are stacked alternatively and passed through the rolling mill, achieving a 50% thickness reduction. This first rolling pass bonds the sheets through plastic deformation to create a solid composite. After this first 50% thickness reduction, the composite is cut in half, restacked, and rolled back together, further refining the microstructure.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification are incorporated by reference as if each had been individually incorporated.

Some embodiments of the current invention are directed to reactive materials, and methods of producing reactive materials, with controlled external geometries that facilitate handling and improve packing, in addition to having reactant layers (e.g. nanoscale layers) within the particles to control stability, reactivity and energy density similar to the tunable properties offered by reactive foils.

Low-cost, laminate reactive powders can be mechanically fabricated according to an embodiment of the current invention in a two-step process. The first process creates a bulk laminate composite structure via a compressive mechanical process such as rolling, forging, swaging, etc. (M. E. Reiss and T. P. Weihs, Method of Making Reactive Multilayer Foil and Resulting Product, U.S. Pat. No. 6,534,194, Mar. 18, 2003; Y. Xun, D. Lunking, E. Besnoin, D. Van Heerden, T. P. Weihs, O. M. Knio, Methods of Making Reactive Composite Materials and Resulting Products Thereof, U.S. Patent Application No. 2009/0178741, the entire contents of which are incorporated herein by reference). The second mechanical step forms laminate particles or powders from these bulk laminate materials. This can be done in a variety of ways, such as repeated rolling to break off material, ball milling, milling, or repeated shearing with a metal blade.

Figure 1:
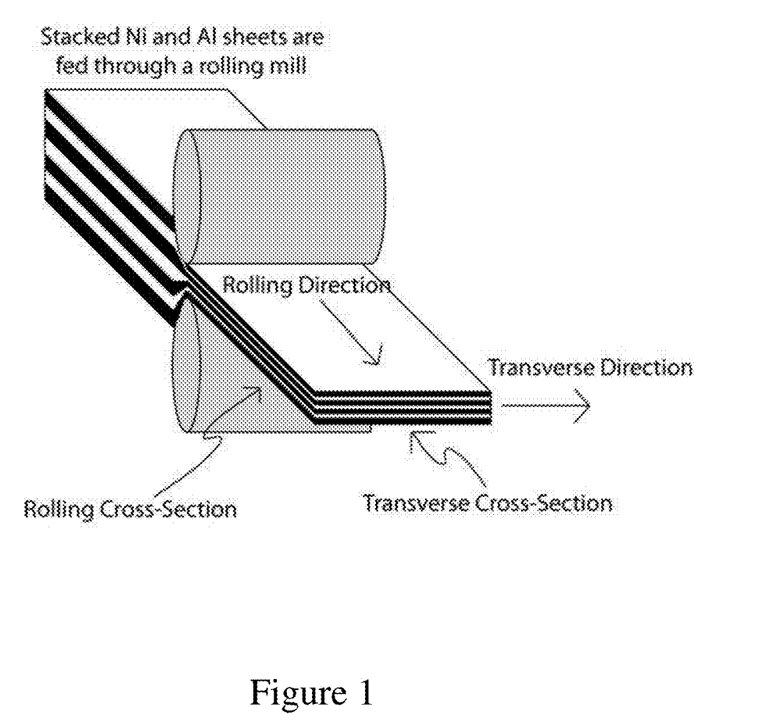

In order to fabricate the initial bulk structures from which powders are formed, two components can be layered upon each other and compressed together to create a reactive laminate. The initial starting materials can be elemental, alloy or compound materials in the form of foils, sheets, wires, rods or powders, for example, and the mechanical processing step can involve any combination of rolling, swaging, pressing or forging, for example, to fabricate these bulk structures (Reiss, et al; Xun, et al., id.). These compressive processes bond the reactant material together, reduce the reactant spacing and tailor the reactivity and microstructure. The term "reactant spacing" refers to an average spacing between the reactants over the bulk structure, over the particle, or over a region of interest of a given structure. A bulk material with a fine spacing of reactants (or microstructure) will be more sensitive to reaction than one with a coarser microstructure. The spacing, layering or microstructure achieved in the first step is maintained when processing the bulk materials into the powders, so a more reactive bulk material will create a more reactive powder. FIG. 1 schematically demonstrates a rolling process as one example of a system by which one can fabricate bulk composites. However, the general concepts of the current invention are not limited to only this example. In this process, two different metal sheets are stacked upon one another and then passed through a rolling mill, bonding the structure together. After the initial bulk structure has been formed, it can be cut in half, stacked and rolled again to further refine the microstructure and tailor the reactivity. This process can be repeated, as desired, to obtain a finer average reactant spacing and hence a more reactive bulk material. Reactive powders with an order of magnitude difference in average reactant spacing can be produced by rolling more or fewer times to control the microstructure of the laminate prior to turning it into a powder.

Figure 2:
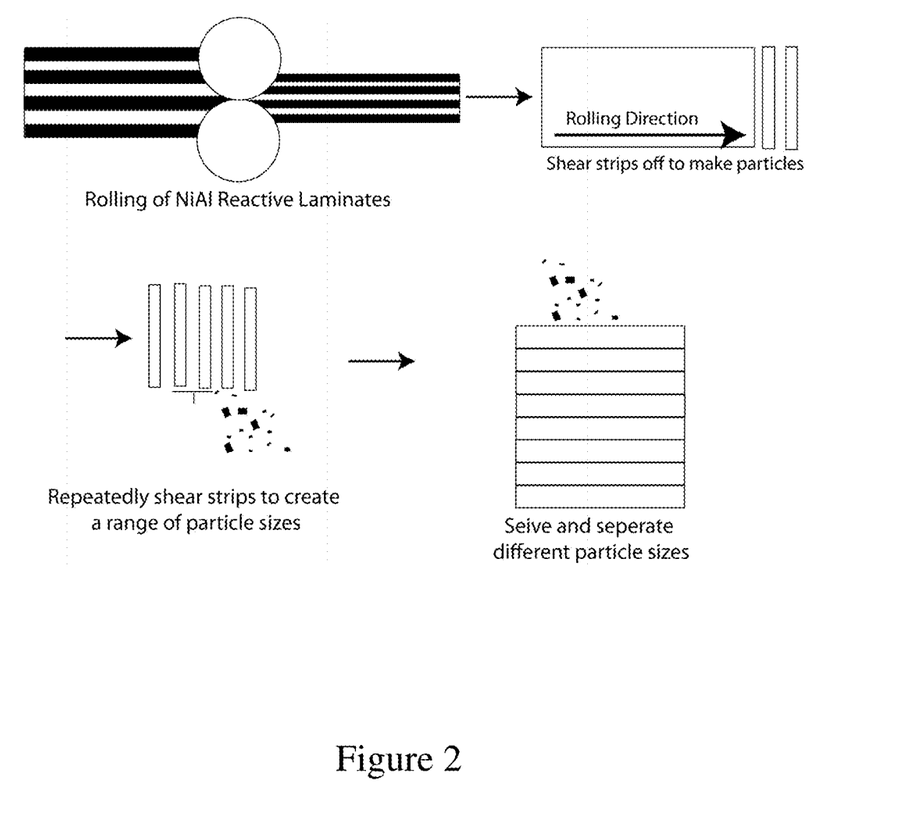
FIG. 2 is a schematic illustration showing the steps of rolling of elemental foils into a consolidated and fully-dense laminate reactive material, shearing strips of reactive laminate material, chopping strips into powders and then sieving powders into different particles sizes according to an embodiment of the current invention.

After the desired bulk laminate material has been produced, reactive powders can be fabricated from the bulk composite via shearing with a metal blade, milling, ball milling, repeated rolling to break off particles or lathing, for example. In order to separate the powders after they have been generated, sieves can be used to filter the particles to desired size ranges. FIG. 2 is a schematic illustration of one possible method to create the loose powders. The initial bulk laminate was fabricated via rolling two different types of elemental sheets together and then shearing these sheets repeatedly with a blade. After the powders were generated via this shearing, they were separated with a series of sieves.

A method of producing a reactive powder according to an embodiment of the current invention includes providing a bulk structure of reactive material that has a first reactant and a second reactant in which the bulk structure has a preselected average spacing between the first and the second reactants, and mechanically processing of the bulk structure of reactive material to produce a plurality of particles from the bulk structure such that each of the plurality of particles has the first and second reactants with an average spacing that is substantially equal to the preselected average spacing of the bulk structure of reactive material. The average spacing of each of the plurality of particles are equal to the preselected spacing based on the particular application. If the average reactant spacing in the particles varies substantially from the bulk material then one is left with little ability to predict the properties of the particles such as ignition threshold, heat and reaction velocity. How close the match must be depends on the application. For some applications, a match to within 10% has been found to be suitable. The first and second materials of the plurality of particles react with each other in an exothermic reaction upon being exposed to a threshold energy to initiate the exothermic reaction and remain substantially stable without reacting with each other prior to being exposed to the threshold energy. One should note that the concepts of the invention are not limited to only two reactants. There can be more than two reactants in some embodiments of the current invention.

The reactants can include, but are not limited to, the following reactant pairs: Ti, Zr or Hf with B; Ti, Zr or Hf with C; Ti, Zr, Ni or Nb with Si; Pd, Pt, Fe, Zr or Ni with Al.

According to an embodiment of the current invention, the preselected average spacing between the first and the second reactants is less than about 5.0 μm for some applications. For some particular applications, the preselected average spacing between the first and said second reactants can be at least 20 nm and less than 1.0 μm. Above 5.0 μm self-propagation is challenging in most material systems without substantial preheating. However, many reactions can self-propagate below 1.0 μm. Choosing too small an average reactant spacing can lead to significant losses of stored energy.

According to some embodiments of the current invention, the step of providing a bulk structure of reactive material can include laminating a first layer of the first reactant to a second layer of the second reactant by a mechanical process. The laminating the first layer of the first reactant to the second layer of the second reactant can include, but is not limited to, at least one of rolling, extruding or swaging. The step of mechanically processing the bulk structure of reactive material to produce the plurality of particles can include, but is not limited to, at least one of shearing, milling, ball milling, rolling or lathing.

The method of producing a reactive powder according to some embodiments of the current invention can also include separating the plurality of particles according to size to provide a plurality of separated particles. For example, the separating the plurality of particles according to size can include passing at least a portion of the plurality of particles through a sieve according to some embodiments of the current invention. An ensemble average minimum dimension of the plurality of separated particles can be less than about 1 mm, for some applications. The sieves allow particles to pass through based on the minimum particle dimension. According to some embodiments of the current application, an ensemble average minimum dimension of the plurality of separated particles can be at least 2 μm and less than about 1 mm. We refer to a minimum dimension of the particles since the particles can be irregular in shape. In further embodiments, an ensemble average minimum dimension of the plurality of separated particles can be at least 150 μm and less than about 212 μm. In some embodiments, the ensemble average minimum dimension of the plurality of separated particles can be at least 53 μm and less than about 106 μm. In some embodiments, the ensemble average minimum dimension of the plurality of separated particles can be at least 38 μm and less than about 45 μm.

The bulk structure and each particle of the plurality of particles can have multilayered structures. For example there can be at least ten alternating layers of the first and second reactants, at least one hundred alternating layers of the first and second reactants, or at least one thousand alternating layers of the first and second materials for some applications. Some embodiments of the current invention include reactive powders produced according to any of the methods of producing reactive powders according to the current invention.

When the number of layers, for example bilayers when there are two reactants, in a reactive particle is very large (>600) the reaction properties approach that of the bulk material as there are enough bilayers present to provide a close representation of the average microstructure. This can be seen by examining FIG. 6. When a relatively large number bilayers are contained in a particle, the heat evolved in the DSC is approximately the same as the bulk material. However, if there are less than ~100 bilayers per particle, the heat evolved drops off significantly and quickly. To properly utilize the particles for any application, one should understand the target heat output which relies almost exclusively on the number of bilayers per particle. This phenomenon is rooted in the breakup during blending/grinding/milling; the variable microstructure from rolling can create particles which are Ni rich or Al rich (for that particular example) simply because there are so few bilayers, on average, contained in any one small particle. For the largest average bilayer we have investigated, 5.53 μm, made into a particle of 30 μm, there would only be 6 bilayers in the particle, meaning the odds of being off in a 50:50 Al:Ni chemistry is quite high and the heat evolved reflects that.

Another embodiment of the current invention is directed to a reactive material that includes a plurality of reactive particles each of which is at least one of fused with or adhered to at least one adjacent reactive particle of the plurality of reactive particles to form a self-supporting structure. Each reactive particle of the plurality of reactive particles includes a first reactant and a second reactant having corresponding reactant spacing that is substantially equal to a preselected reactant spacing, and the first and second reactants react with each other in an exothermic reaction upon being exposed to a threshold energy to initiate the exothermic reaction and remain substantially stable without reacting with each other prior to being exposed to the threshold energy.

The plurality of reactive particles can be, but is not limited to, a reactive powder produced according to embodiments of the current invention. The reactive material can also include a plurality of particles of a third material, each of which is adhered to at least one of the plurality of reactive particles. For example, the third material can include at least one of a solder, a fuel and a high-density material. The solder can be an alloy that includes at least one of Pb, Ag, Au, Sn, Cu, In, and Sb, for example. The high-density material can include at least one of W, Ta, Pb, Re, Os, Ir, Pt, Hf, Au, and combinations thereof. The fuel can include at least one of Al, Zr, Ti, Si, B, C and Al—Mg, for example.

Another embodiment of the current invention is a method of producing an object from a reactive powder that includes providing a powder that includes a plurality of reactive particles, and compressing the powder to form a self-supporting structure from the plurality of reactive particles. Each reactive particle of the plurality of reactive particles have a first reactant and a second reactant in which a corresponding reactant spacing is substantially equal to a preselected reactant spacing, and the first and second reactants react with each other in an exothermic reaction upon being exposed to a threshold energy to initiate the exothermic reaction and remain substantially stable without reacting with each other prior to being exposed to the threshold energy. The powder can be, but is not limited to powders according to some embodiments of the current invention. The powder can be produced according to methods of producing powders according to the current invention. However, this embodiment of the current invention is not limited to only powders produced in that way. The method can further include, but is not limited to, packing the plurality of reactive particles into a compressible container according to some embodiments of the current invention. In some embodiments, the compressing can include, but is not limited to, swaging, for example. The method of producing an object from a reactive powder according to some embodiments of the current invention can further include at least one of milling, lathing, bending or cutting the self-supporting structure.

Another embodiment of the current invention is directed to a method of patterning a layer of reactive material onto an object that includes providing a plurality of reactive particles, and depositing the plurality of reactive particles onto a surface of the object. The depositing includes at least one of spraying, spreading, flowing or printing the plurality of reactive particles onto the surface of the substrate. Each reactive particle of the plurality of reactive particles includes a first reactant and a second reactant that have corresponding reactant spacing substantially equal to a preselected reactant spacing. The first and second reactants react with each other in an exothermic reaction upon being exposed to a threshold energy to initiate the exothermic reaction and remain substantially stable without reacting with each other prior to being exposed to the threshold energy. The plurality of reactive particles can be, but is not limited to powders according to some embodiments of the current invention. The plurality of reactive particles can be produced according to methods of producing powders according to the current invention. However, this embodiment of the current invention is not limited to only powders produced in that way.

The method of patterning a layer of reactive material onto an object according to some embodiments of the current invention can further include mixing the plurality of reactive particles with a fluid, such as a liquid or gas, prior to the depositing.

EXAMPLES

The following provides some examples according to some embodiments of the current invention. These examples are provide to facilitate a description of some of the concepts of the invention and are not intended to limit the claims.

Figure 3:
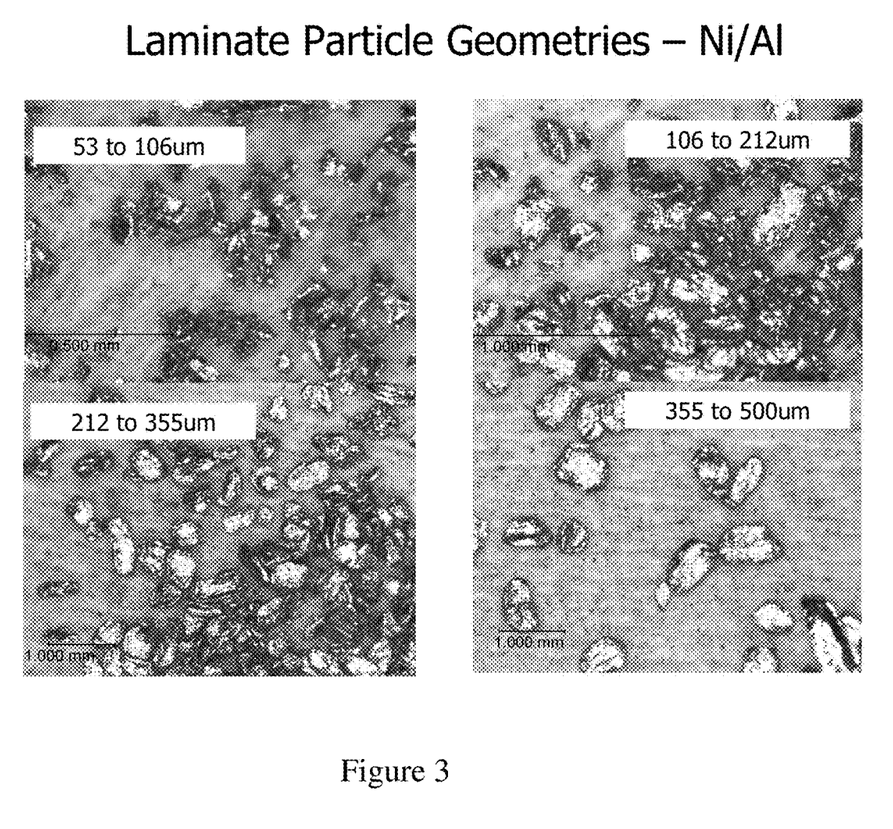
FIG. 3 shows optical micrographs taken of particles obtained by following the mechanical processing steps shown in FIG. 2. The particles sizes listed in each of the photographs marks the minimum and minimum sieve size used to separate the particles.

After production, the properties of reactive laminate powders or particles will depend strongly on two different variables: their microstructure and their size, for a given chemistry. Microstructure refers predominantly to the distribution of reactant layers within the particles. Size refers to their average diameter. FIG. 3 shows four different ranges of particles sizes that were obtained by sieving. Note that the mechanically processed powders have a fairly constant shape within a given size range.

The microstructure of the loose powders can play a role in their reactivity since smaller reactant spacings will make the powders more sensitive to initiation of their exothermic reaction and their reactions will also propagate faster compared to powders with larger reactant spacings. However, in addition to the average reactant spacing (or layer thickness) being an important parameter, the distribution of reactant spacings (or layer thicknesses) is also an important factor in determining properties of the powders. A very broad distribution of reactant layer thicknesses will lead to some small powders having very few reactant layers and the possibility of nonstoichiometric compositions. In the example cited broad distributions lead to many small powders with Al-rich and Ni-rich compositions. Thus, the average reactant layer thickness and the distribution of layer thickness play a significant role in determining the properties of powders as a function of powder size. Examples of this are shown below in FIGS. 4-6.

Figure 4:
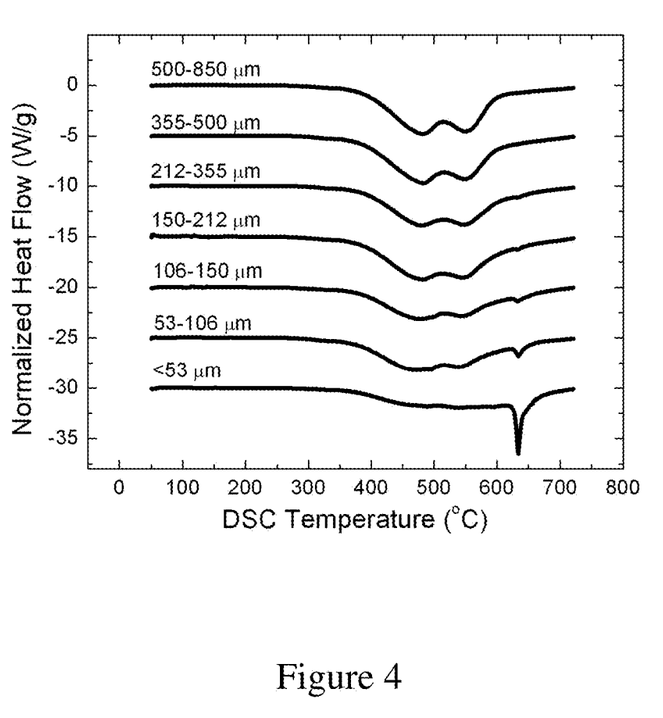
FIG. 4 shows plots of heat flow versus temperature for Differential Scanning calorimetery experiments on Ni/Al laminate particles cut from Ni/Al laminates (as described in FIG. 2) with an average bilayer thickness of 1.5 μm. Note that the peak shapes and positions change on moving from large to small particles.
Figure 5:
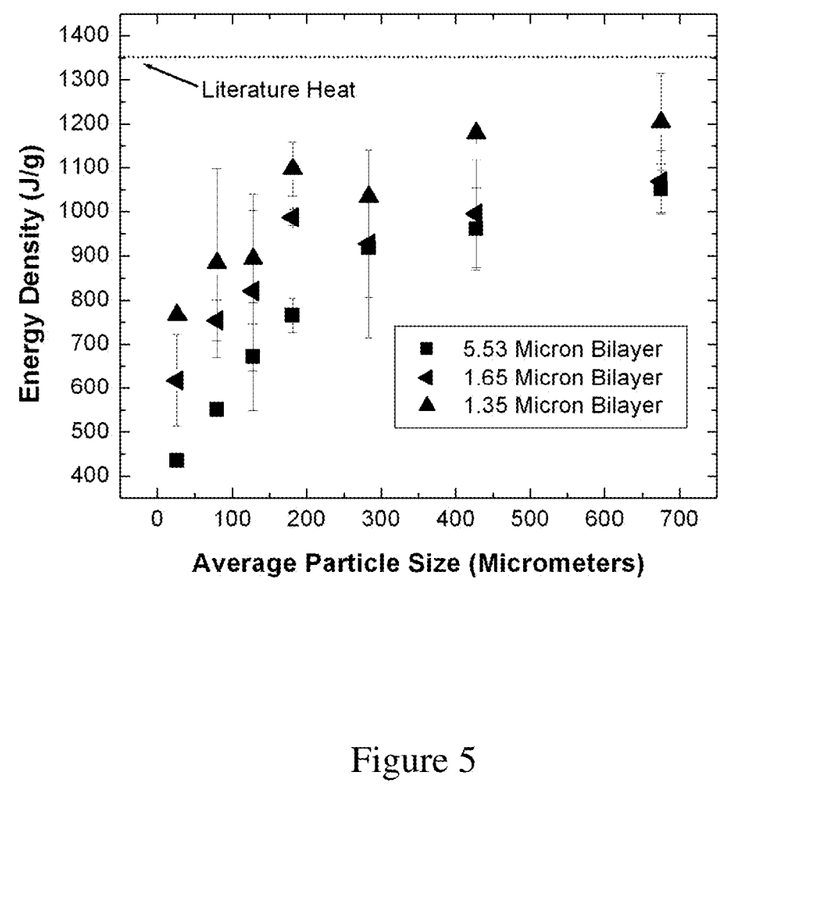
FIG. 5 shows a plot of heats of reaction measured by DSC for three different initial laminate conditions and multiple different particles sizes. The average bilayer thicknesses for the initial three laminates were 1.35 μm, 1.65 μm and 5.53 μm. Note that the heats of reaction decrease at smaller particle sizes.

Powders of different sizes that are machined from the same bulk laminate materials can have very different total heats of reaction. FIG. 4 shows differential scanning calorimetery (DSC) scans of powders with the same bilayer spacing but different size ranges. Powders of the largest sizes behave similarly to the bulk materials from which they were formed, but the smallest powders show a deviation from the bulk materials and larger powders. The size and shape of the exothermic peaks in the DSC scans shift as a function of particle size, suggesting a different chemistry brought about by a different distribution of reactants compared to the parent laminate material. By integrating the plots in FIG. 4 one obtains the heats of reaction for the particles and these values are plotted for three different initial laminates in FIG. 5. Note in FIG. 5 that the heats of reaction for each of the initial laminate microstructures drop off at smaller particle sizes, so not only is the shape of the curves different, but the overall energy released from the intermetallic reaction is different as well. Further still note that the drop-off at the smallest particle size range is greatest for powders machined from laminates with the largest initial microstructure or bilayer thickness. The drop off in heat is attributed to a loss of the initial 50:50 atomic composition via the development of particles with Al-rich or Ni-rich compositions. The presence of Al-rich and Ni-rich in the small powders cited above has been verified using XRD scans of powders after reaction and density measurements prior to reaction.

Figure 6:
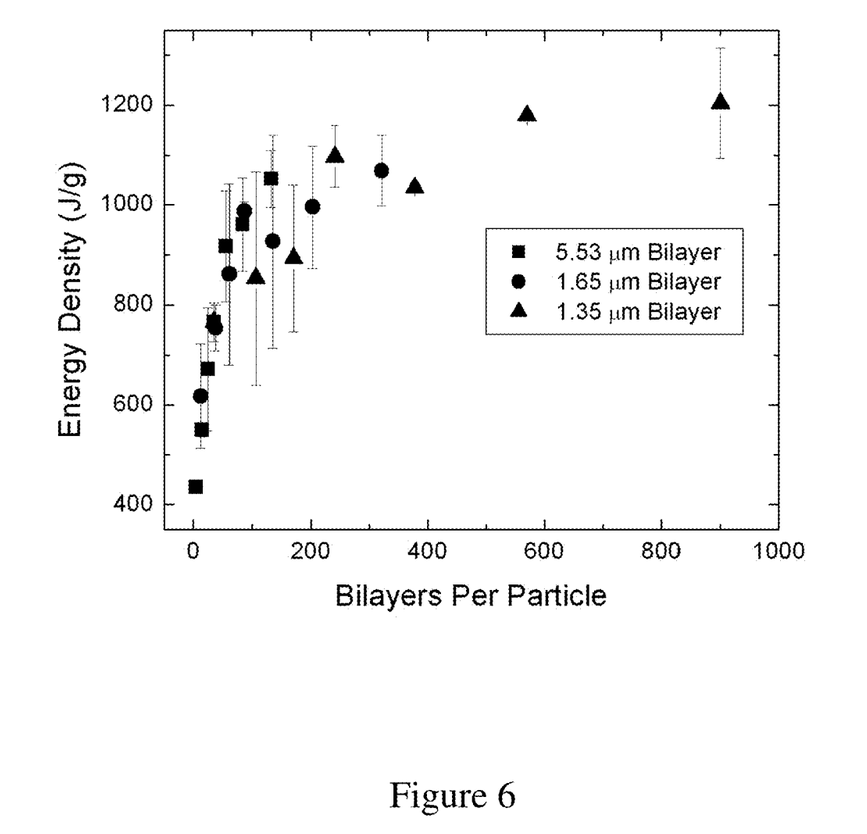
FIG. 6 shows heats of reaction from FIG. 5 that are replotted versus particles size normalized by average bilayer thickness. The average bilayer thicknesses for the initial three laminates were 1.35 μm, 1.65 μm and 5.53 μm. Note that the heats of reaction decrease in a similar manner at smaller particle sizes for all three initial laminates.

The dependence of powder properties on both reactant layer distributions and particle size is verified by the data in FIG. 6. In this figure measured heats of reaction are plotted versus particle size divided by average bilayer thickness. Note that the data in FIG. 5 fall on a similar curve once particle size is normalized by bilayer thickness. Further still, particles obtained from bulk laminate samples that have been processed using alternative rolling techniques or other mechanical processing techniques will show a different dependence in FIG. 6. This shows that one must account for both reactant thickness distributions as well as particle sizes when fabricating particles with specific properties. The need for such characterizations is unique to laminate reactive powders fabricated by mechanical processing techniques as their distribution of reactants is non-uniform and varied both within a given particle and from particle to particle.

Components with Complex Geometries

Figure 7:
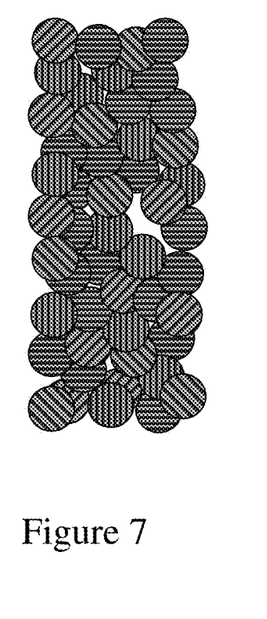
FIG. 7 is a schematic illustration of a loose compact of composite reactive powders according to an embodiment of the current invention. As opposed to traditional compacts, there is essentially no chemical mixing across the particles that make up the compact, only within the particles themselves. Thermal diffusion, however, propagates the reaction across the compact.

After the loose reactive powders have been properly separated, they can be reformed into complex geometries through a variety of processes, such as swaging, pressing, cold-spraying or screen printing. FIG. 7 shows a loose compact of laminate reactive powders. A loose compact such as this could serve as a chemical delay.

Figure 8:
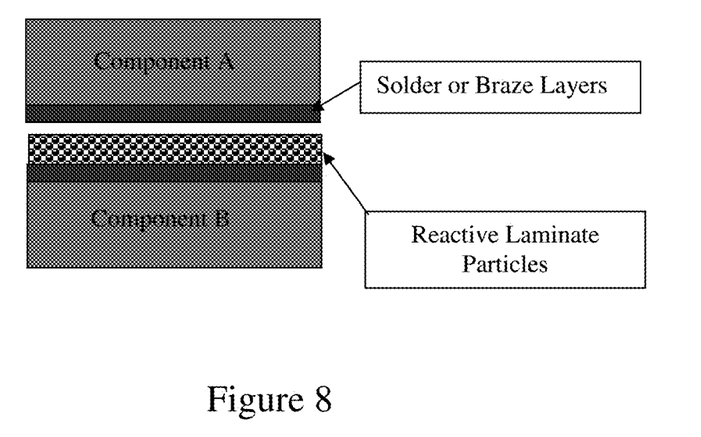
FIG. 8 is a schematic illustration of a cross-sectional view showing two components with solder or braze layers according to an embodiment of the current invention. In between the solder or braze layers is positioned a compact of reactive powder. The reactive powders can be loose or solid compacts. They can be positioned with a variety of techniques and are designed to provide sufficient heat to melt the solder or braze layers and form a strong metallic bond between components A and B.
Figure 9:
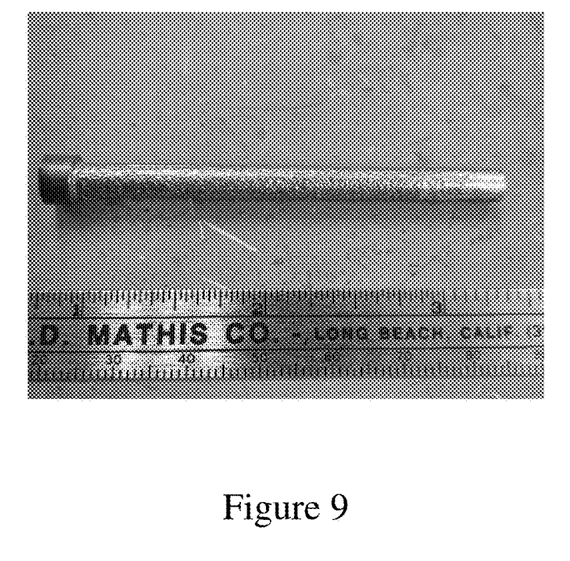
FIG. 9 is a photograph of a swaged compact of reactive laminate particles according to an embodiment of the current invention. The steel jacket has been machined off of most of the compact and is visible at the far left end of the rod. The laminate particles have been compacted sufficiently to obtain significant tensile and compressive strength which allows the compact to have its steel jacket removed by machining without loss of material in the compact or damage to the compact.
Figure 10:
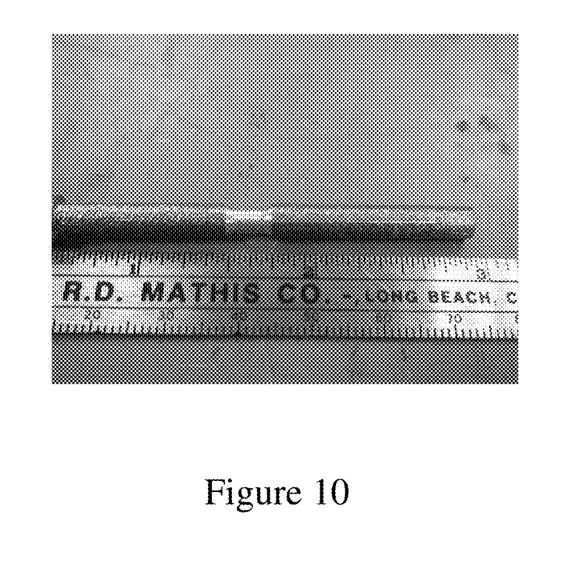
FIG. 10 is a photograph of a swaged compact of reactive laminate particles after being turned down with a lathe according to an embodiment of the current invention. The compacts are fully machinable into complex parts for testing and other applications, such as joining.
Figure 11:
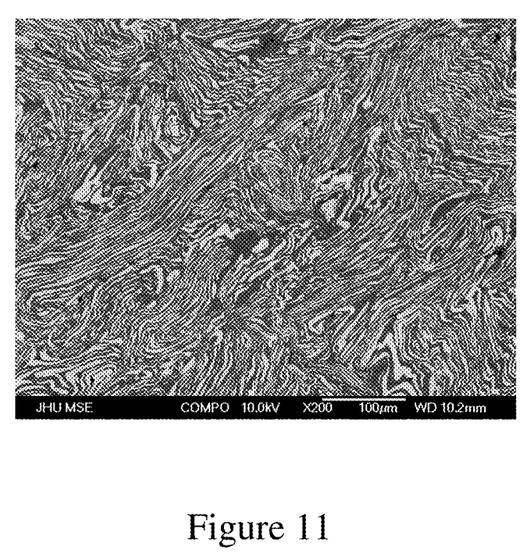
FIG. 11 is an SEM image of a cross-section of the swaged compact in FIGS. 9 and 10. The random particle orientation can be clearly seen.
Figure 12:
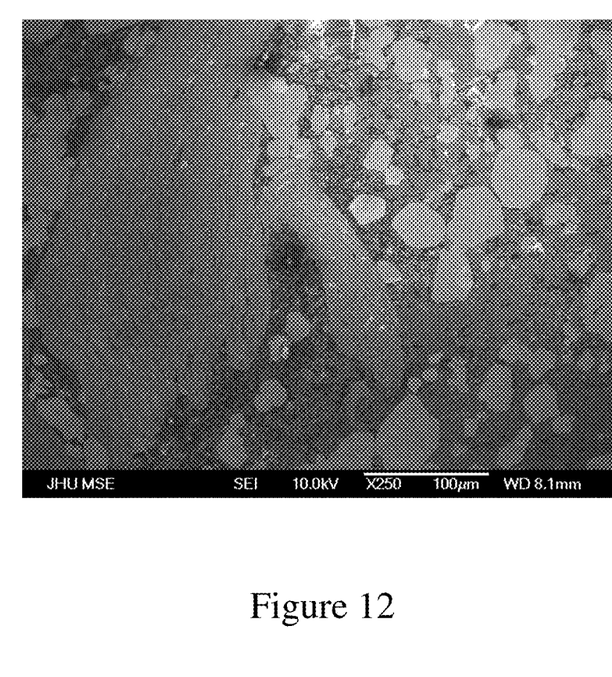
FIG. 12 is an SEM image of a cross-section of reactive laminate powders packed in a tube with Al and W and swaged according to an embodiment of the current invention. The soft Al forms a matrix (dark material) around the W (light chunks of material) and the reactive laminate particles (seen on the left of the image.) Innumerable combinations of powders can be compacted with reactive laminate particles.

Powders can also be pressed, cold-sprayed or screen printed to complex shapes onto one or more components to enable reactive bonding of components. FIG. 8 shows a cross-section of a two components A and B that can be bonded together using the reactive particles as a heat source and solder or braze material as wetting and fusible layers.

Swaging is a process which reduces the diameter of metal tubes or rods by hammering them with tapered dies and can be used to compact mechanically processed powders. To swage powders, they must be first packed into metallic tubes, compressed with a load frame or other mechanical device, and then have both ends plugged to secure the powders inside the tubes. The end that is to be inserted into the swager should have its plug made from aluminum to allow for deformation, while the back cap should be made from steel to resist deformation during the initial compaction.

The swager will gradually reduce the diameter by using a series of dies that control the final diameter of the tube. As the diameter of the component is reduced, the degree of compaction increases and so does thermal transport within the component. After the initial compaction and a 2× reduction in diameter by swaging, the samples are typically >97% dense. After swaging has been completed, the original steel jacket used to contain the powders can be removed via milling or lathing. FIG. 8 shows a side view of a completed component with the steel jacket and powder compacts demarcated.

Many other conventional methods of distributing and shaping particles into useful components can also be used. Such techniques include but are not limited to cold isostatic pressing, cold spraying hot isostatic pressing, forging, explosive compaction and screen printing. The resulting reactive components will have unique microstructures compared to other reactive materials. They will have distinct laminate particles or powders that have been consolidated to some degree. However, unlike conventional powder compacts, each of the laminate powders will have many layers that alternate between two reactants that can mix and produce heat. Thus, almost all atomic mixing will occur within particles and not between the particles like in conventional powder compacts.

The embodiments illustrated and discussed in this specification are intended only to teach those skilled in the art the best way known to the inventors to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A reactive powder produced according to a method comprising:
   providing a bulk structure of reactive material comprising a first reactant and a second reactant, said bulk structure having an average spacing between said first and said second reactants less than about 5.0 µm; and
   mechanically processing said bulk structure of reactive material to produce a plurality of particles from said bulk structure such that each of said plurality of particles comprises said first and second reactants having an average spacing that is substantially equal to said average spacing of said bulk structure of reactive material,
   wherein said first and second reactants of said plurality of particles react with each other in an exothermic reaction upon being exposed to a threshold energy to initiate said exothermic reaction and remain substantially stable without reacting with each other prior to being exposed to said threshold energy, and
   wherein the bulk structure of reactive material has at least ten alternating layers of first and second layers, wherein the first layer in the alternating layers comprises the first reactant and the second layer in the alternating layers comprises the second reactant.

2. A reactive material comprising:
   a plurality of reactive particles each of which is at least one of fused with or adhered to at least one adjacent reactive particle of said plurality of reactive particles to form a self-supporting structure,
   wherein each reactive particle of said plurality of reactive particles comprises a first reactant and a second reactant having corresponding reactant spacing substantially equal to a reactant spacing less than about 5.0 µm, and
   wherein said first and second reactants react with each other in an exothermic reaction upon being exposed to a threshold energy to initiate said exothermic reaction and remain substantially stable without reacting with each other prior to being exposed to said threshold energy, and
   wherein each reactive particle of said plurality of reactive particles comprises at least ten alternating layers of said first and second reactants.

3. A reactive material according to claim 2, wherein said preselected reactant spacing is at least 20 nm and less than 1.0 µm.

4. A reactive material according to claim 2, wherein an ensemble average of a minimum dimension of said plurality of reactive particles is less than about 1 mm.

5. A reactive material according to claim 2, wherein an ensemble average of a minimum dimension of said plurality of reactive particles is at least 2.0 µm and less than about 1 mm.

6. A reactive material according to claim 2, wherein an ensemble average of a minimum dimension of said plurality of reactive particles is at least 150 µm and less than about 212 µm.

7. A reactive material according to claim 2, wherein an ensemble average of a minimum dimension of said plurality of reactive particles is at least 53 µm and less than about 106 µm.

8. A reactive material according to claim 2, wherein an ensemble average of a minimum dimension of said plurality of reactive particles is at least 38 µm and less than about 43 µm.

9. A reactive material according to claim 2, further comprising a plurality of particles of a third material each of which is adhered to at least one of said plurality of reactive particles.

10. A reactive material according to claim 9, wherein said plurality of particles of said third material comprise at least one of a solder, a fuel and a high-density material having a density greater than about 11 $g/cm^3$.

11. A reactive material according to claim 10, wherein said high-density material is selected from the group consisting of W, Ta, Pb, Re, Os, Ir, Pt, Hf, Au and combinations thereof.

12. A reactive material according to claim 10, wherein said fuel is selected from the group consisting of Al, Zr, Ti, Al—Mg, Si, B, C and combinations thereof.

13. A reactive material according to claim 2, wherein said first reactant is selected from the group consisting of Ti, Zr, and Hf, and said second reactant is B.

14. A reactive material comprising:
   a plurality of reactive particles each of which is at least one of fused with or adhered to at least one adjacent reactive particle of said plurality of reactive particles to form a self-supporting structure,
   wherein each reactive particle of said plurality of reactive particles comprises a first reactant and a second reactant having corresponding reactant spacing, and
   wherein said first and second reactants react with each other in an exothermic reaction upon being exposed to a threshold energy to initiate said exothermic reaction and remain substantially stable without reacting with each other prior to being exposed to said threshold energy, wherein each reactive particle of said plurality of reactive particles comprises at least ten alternating layers of said first and second reactants.

15. A reactive material according to claim 14, wherein each reactive particle of said plurality of reactive particles comprises at least one hundred alternating layers of said first and second reactants.

16. A reactive material according to claim 14, wherein each reactive particle of said plurality of reactive particles comprises at least one thousand alternating layers of said first and second reactants.

17. A reactive material comprising:

a plurality of reactive particles each of which is at least one of fused with or adhered to at least one adjacent reactive particle of said plurality of reactive particles to form a self-supporting structure;

a plurality of particles of a third material each of which is adhered to at least one of said plurality of reactive particles, wherein each reactive particle of said plurality of reactive particles comprises a first reactant and a second reactant having corresponding reactant spacing, and wherein said first and second reactants react with each other in an exothermic reaction upon being exposed to a threshold energy to initiate said exothermic reaction and remain substantially stable without reacting with each other prior to being exposed to said threshold energy, wherein said plurality of particles of said third material comprise at least one of a solder, a fuel and a high-density material having a density greater than about 11 $g/cm^3$, wherein said solder is an alloy comprising at least one of Pb, Ag, Au, Sn, Cu, In and Sb.

* * * * *